United States Patent
Satoh et al.

(10) Patent No.: US 10,923,256 B2
(45) Date of Patent: Feb. 16, 2021

(54) R-T-B-BASED SINTERED MAGNET AND METHOD FOR PRODUCING SAME

(71) Applicant: HITACHI METALS, LTD., Tokyo (JP)

(72) Inventors: Teppei Satoh, Mishima-gun (JP); Futoshi Kuniyoshi, Mishima-gun (JP); Rintaro Ishii, Mishima-gun (JP); Takeshi Nishiuchi, Mishima-gun (JP); Noriyuki Nozawa, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 448 days.

(21) Appl. No.: 15/739,261

(22) PCT Filed: Jun. 17, 2016

(86) PCT No.: PCT/JP2016/068115
§ 371 (c)(1),
(2) Date: Dec. 22, 2017

(87) PCT Pub. No.: WO2016/208508
PCT Pub. Date: Dec. 29, 2016

(65) Prior Publication Data
US 2018/0182518 A1    Jun. 28, 2018

(30) Foreign Application Priority Data

Jun. 25, 2015 (JP) .............................. JP2015-127295

(51) Int. Cl.
| | | |
|---|---|---|
| H01F 1/057 | (2006.01) |
| H01F 41/02 | (2006.01) |
| B22F 9/04 | (2006.01) |
| B22F 3/16 | (2006.01) |
| B22F 3/24 | (2006.01) |
| C22C 38/00 | (2006.01) |
| H01F 1/08 | (2006.01) |
| B22F 1/00 | (2006.01) |
| C22C 33/02 | (2006.01) |
| B22F 3/00 | (2021.01) |
| C22C 1/04 | (2006.01) |
| C22C 30/02 | (2006.01) |

(52) U.S. Cl.
CPC .............. *H01F 1/0577* (2013.01); *B22F 1/00* (2013.01); *B22F 3/00* (2013.01); *B22F 3/16* (2013.01); *B22F 3/24* (2013.01); *B22F 9/04* (2013.01); *C22C 1/04* (2013.01); *C22C 30/02* (2013.01); *C22C 33/02* (2013.01); *C22C 38/00* (2013.01); *H01F 1/057* (2013.01); *H01F 1/08* (2013.01); *H01F 41/02* (2013.01); *H01F 41/0266* (2013.01); *B22F 2003/248* (2013.01); *B22F 2009/049* (2013.01); *B22F 2202/05* (2013.01); *B22F 2301/355* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 2011/0025440 A1* | 2/2011 | Kuniyoshi .......... C22C 33/0278 335/302 |
| 2012/0091844 A1 | 4/2012 | Nakajima |
| 2014/0132377 A1 | 5/2014 | Nakajima et al. |
| 2014/0247100 A1 | 9/2014 | Tsubokura et al. |
| 2014/0286815 A1 | 9/2014 | Ishiyama et al. |
| 2014/0286816 A1 | 9/2014 | Kato et al. |
| 2014/0308152 A1 | 10/2014 | Tsubokura et al. |
| 2016/0163434 A1 | 6/2016 | Kanada et al. |
| 2017/0025207 A1 | 1/2017 | Nakajima et al. |

FOREIGN PATENT DOCUMENTS

| | | |
|---|---|---|
| JP | 2008-264875 A | 11/2008 |
| WO | 2009/122709 A1 | 10/2009 |
| WO | 2010/113371 A1 | 10/2010 |
| WO | 2013/008756 A1 | 1/2013 |
| WO | 2013/054854 A1 | 4/2013 |
| WO | 2015/020181 A1 | 2/2015 |

OTHER PUBLICATIONS

International Search Report of PCT/JP2016/068115 dated Sep. 6, 2016 [PCT/ISA/210].
International Preliminary Report on Patentability and Translation of Written Opinion, dated Dec. 26, 2017 from the International Bureau in counterpart International application No. PCT/JP2016/068115.

* cited by examiner

*Primary Examiner* — Xiaowei Su
(74) *Attorney, Agent, or Firm* — Sughrue Mion, PLLC

(57) ABSTRACT

To provide an R-T-B based sintered magnet including R: 27.5 to 34.0% by mass, RH: 2 to 10% by mass, B: 0.89 to 0.95% by mass, Ti: 0.1 to 0.2% by mass, Ga: 0.3 to 0.7% by mass, Cu: 0.07 to 0.50% by mass, Al: 0.05 to 0.50% by mass, M (M is Nb and/or Zr): 0 to 0.3% by mass, balance T, and inevitable impurities, the following inequality expressions (1), (2), and (3) being satisfied:

$$[T]-72.3([B]-0.45[Ti])>0 \qquad (1)$$

$$([T]-72.3([B]-0.45[Ti]))/55.85<13[Ga]/69.72 \qquad (2)$$

$$[Ga] \geq [Cu] \qquad (3).$$

7 Claims, No Drawings

R-T-B-BASED SINTERED MAGNET AND METHOD FOR PRODUCING SAME

CROSS REFERENCE TO RELATED APPLICATIONS

This application is a National Stage of International Application No. PCT/JP2016/068115, filed Jun. 17, 2016 (claiming priority based on Japanese Patent Application No. 2015-127295, filed Jun. 25, 2015), the contents of which are incorporated herein by reference in their entirety.

TECHNICAL FIELD

The present disclosure relates to an R-T-B based sintered magnet and a method for producing same.

BACKGROUND ART

An R-T-B based sintered magnet (R is composed of a light rare-earth element RL and a heavy rare-earth element RH, RL is at least one of Nd and Pr and indispensably contains Nd, RH is at least one of Dy, Tb, Gd, and Ho, and T is a transition metal element and indispensably contains Fe) is known as a magnet with the highest performance among permanent magnets, and is used in various motors such as voice coil motors (VCM) of hard disk drives, motors for electric vehicles (EV, HV, PHV, etc.), and motors for industrial equipment, home appliances and the like.

The R-T-B based sintered magnet is mainly composed of a main phase made of an $R_2T_{14}B$ compound, and a grain boundary phase located on a grain boundary portion of this main phase. The $R_2T_{14}B$ compound as the main phase is a ferromagnetic material having high saturation magnetization and anisotropy magnetic field, and now forms the backbone of properties of the R-T-B based sintered magnet.

The R-T-B based sintered magnet has its coercive force $H_{cJ}$ (hereinafter sometimes simply referred to as "$H_{cJ}$") reduced at high temperatures, leading to irreversible thermal demagnetization. For this reason, the R-T-B based sintered magnet is required to have high $H_{cJ}$ especially when applied in motors for electric vehicles.

It has been known that $H_{cJ}$ is improved when RL included in R of an $R_2T_{14}B$ compound as a main phase is partially substituted with RH in the R-T-B based sintered magnet. With increasing the amount of substitution of RH, $H_{cJ}$ is improved.

However, when RL in the $R_2T_{14}B$ compound is substituted with RH, $H_{cJ}$ of the R-T-B based sintered magnet is improved, while a residual magnetic flux density $B_r$ (hereinafter sometimes simply referred to as "$B_r$") decreases. Particularly, Dy has various issues, including inconsistent supply and large fluctuations in price due to minimal abundance and restricted areas where their resources are located, and the like. For this reason, there is a need to improve $H_{cJ}$ without using RH as much as possible (by decreasing the amount as much as possible).

Patent Document 1 mentions that the amount of B is limited to relatively small specific range compared to an R-T-B based alloy that has conventionally been used, while at least one element selected from Al, Ga, and Cu is included as a metal element M to form an $R_2T_{17}$ phase, thus ensuring an adequate volume fraction of a transition metal-rich phase ($R_6T_{13}M$) formed using the $R_2T_{17}$ phase as a raw material, whereby an R-T-B based rare-earth sintered magnet with high coercive force can be produced while decreasing the content of Dy.

CONVENTIONAL ART DOCUMENT

Patent Document

Patent Document 1: WO 2013/008756 A

DISCLOSURE OF THE INVENTION

Problems to be Solved by the Invention

As mentioned above, the R-T-B based sintered magnet is used most often in motors. Therefore, if the magnetic properties of the R-T-B based sintered magnet are improved, motors can have either increased outputs or reduced sizes. Therefore, it is very effective to improve $B_r$ and $H_{cJ}$. However, there is a need to increase a squareness ratio $H_k/H_{cJ}$ (hereinafter sometimes simply referred to as "$H_k/H_{cJ}$") together with these properties. Low $H_k/H_{cJ}$ leads to a decrease in critical demagnetization field intensity, thus causing a problem that demagnetization easily occurs. Therefore, there is required an R-T-B based sintered magnet having high $B_r$ and high $H_{cJ}$ and having high $H_k/H_{cJ}$. In the filed of the R-T-B based sintered magnet, $H_k$, which is a parameter measured to obtain a squareness ratio, is usually a value on the H axis in a graph of a I (intensity of magnetization)-H (intensity of magnetic field) curve, at a position in the second quadrant where I is 0.9 $B_r$. The squareness ratio is defined as a value ($H_k/H_{cJ}$) obtained by dividing $H_k$ by $H_{cJ}$ in the above demagnetization curve.

A sintered magnet with the composition as mentioned in Patent Document 1, in which the amount of B is set lower than that in the standard R-T-B based sintered magnet (set lower than the amount of B in a stoichiometric ratio of an $R_2T_{14}B$ type compound) and Ga is added, can achieve high $B_r$ and high $H_{cJ}$. However, there arose a problem that $H_k/H_{cJ}$ decreases compared to the standard R-T-B based sintered magnet (the amount of B is higher than that in a stoichiometric ratio of an $R_2T_{14}B$ type compound). For example, as shown in Table 4 to Table 6 of Patent Document 1, the squareness ratio (Sq (squareness) in Patent Document 1) is about 90% and, when containing a heavy rare-earth element RH (Dy), the squareness ratio is often 80% level, so that it would be difficult to consider the level as high. Although Patent Document 1 does not mention definition of the squareness ratio, JP 2007-119882 A by the same applicant cited as conventional art document of Patent Document 1 mentions the squareness ratio as a "value expressed by percent, which is obtained by dividing a value of an external magnetic field in which magnetization accounts for 90% of saturation magnetization by iHc", so that definition of the squareness ratio of Patent Document 1 is considered to be the same. In other words, definition of the squareness ratio of Patent Document 1 is considered to be the same as definition that is commonly used.

It is an object of the present invention to provide an R-T-B based sintered magnet having high $B_r$ and high $H_{cJ}$ and having high $H_k/H_{cJ}$ without using RH as much as possible (by decreasing the amount as much as possible), and a method for producing same.

Means for Solving the Problems

An R-T-B based sintered magnet according to a first aspect of the present invention includes:

R (R is at least one of rare-earth elements, and indispensably contains Nd and a heavy rare-earth element RH (at least one of Dy, Tb, Gd, and Ho)): 27.5 to 34.0% by mass, RH: 2 to 10% by mass,
B: 0.89 to 0.95% by mass,
Ti: 0.1 to 0.2% by mass,
Ga: 0.3 to 0.7% by mass,
Cu: 0.07 to 0.50% by mass,
Al: 0.05 to 0.50% by mass,
M (M is Nb and/or Zr): 0 to 0.3% by mass,
balance T (T is a transition metal element and indispensably contains Fe), and inevitable impurities, the following inequality expressions (1), (2), and (3) being satisfied:

$$[T]-72.3([B]-0.45[Ti])>0 \quad (1)$$

$$([T]-72.3([B]-0.45[Ti]))/55.85<13[Ga]/69.72 \quad (2)$$

$$[Ga]\geq[Cu] \quad (3)$$

where [T] is the content of T expressed in terms of % by mass, [B] is the content of B expressed in terms of % by mass, [Ti] is the content of Ti expressed in terms of % by mass, [Ga] is the content of Ga expressed in terms of % by mass, and [Cu] is the content of Cu expressed in terms of % by mass.

An R-T-B based sintered magnet according to a second aspect of the present invention is the R-T-B based sintered magnet according to the first aspect, further including:
Ti: 0.1% by mass or more and less than 0.15% by mass.

A method for producing an R-T-B based sintered magnet according to a third aspect of the present invention is a method for producing the R-T-B based sintered magnet according to the first or second aspect, the method including:
a step of preparing one or more kinds of main alloy powders and one or more kinds of additional alloy powders;
a step of mixing the one or more kinds of additional alloy powders with 0.5% by mass or more and 20% by mass or less among 100% by mass of a mixed alloy powder after mixing to obtain the mixed alloy powder of the one or more kinds of main alloy powders and the one or more kinds of additional alloy powders;
a molding step of molding the mixed alloy powder to obtain a molded body;
a sintering step of sintering the molded body to obtain a sintered body; and
a heat treatment step of subjecting the sintered body to a heat treatment;
wherein the one or more kinds of main alloy powders have the composition including:
R: 27.5 to 34.0% by mass,
RH: 2 to 10% by mass,
B: 0.89 to 0.97% by mass,
Ti: 0 to 0.2% by mass (excluding 0% by mass when Ti accounts for 0% by mass in the one or more kinds of additional alloy powders),
Ga: 0 to 0.4% by mass,
Cu: 0.07 to 0.50% by mass,
Al: 0.05 to 0.50% by mass,
balance T and inevitable impurities, and
the one or more kinds of additional alloy powders have the composition including:
R1 (R1 is at least one of rare-earth elements other than a heavy rare-earth element RH, and indispensably contains Nd): 32 to 66% by mass,
B: 0.3 to 0.9% by mass,
Ti: 0 to 4% by mass (excluding 0% by mass when Ti accounts for 0% by mass in the one or more kinds of main alloy powders),
Ga: 0.7 to 12% by mass,
Cu: 0 to 4% by mass,
Al: 0 to 10% by mass,
balance T and inevitable impurities, the composition satisfying the following inequality expression (4):

$$[T]\leq 72.4[B] \quad (4).$$

A method for producing an R-T-B based sintered magnet according to a fourth aspect of the present invention is the method for producing an R-T-B based sintered magnet according to the third aspect, wherein the one or more kinds of main alloy powders are obtained by using a strip casting method.

Effects of the Invention

According to the present invention, it is possible to provide an R-T-B based sintered magnet having high $B_r$ and high $H_{cJ}$ and having high $H_k/H_{cJ}$ without using RH as much as possible, and a method for producing same.

MODE FOR CARRYING OUT THE INVENTION

The inventors of the present invention have studied and found that, when the composition of a sintered magnet is adjusted to the composition in which a boride of Ti is formed during the production process using Ti in a specific range, whereby, the amount of B obtained by subtracting the amount of B consumed by formation of the boride of Ti from the total amount of B of the R-T-B based sintered magnet, in other words, the amount of B remaining without forming the boride with Ti (hereinafter sometimes referred to as "amount of effective B" or "amount of $B_{eff}$") is set lower than the total amount of B of the standard R-T-B based sintered magnet (set lower than the amount of B in a stoichiometric ratio of an $R_2T_{14}B$ type compound) and Ga is added, it is made possible to obtain an R-T-B based sintered magnet having high $B_r$ and high $H_{cJ}$ and having high $H_k/H_{cJ}$.

There are still unclear points regarding the reason why the R-T-B based sintered magnet according to the embodiment of the present invention has high $B_r$ and high $H_{cJ}$ and has high $H_k/H_{cJ}$. A description will be made on the mechanism proposed by the inventors of the present invention based on the findings they have had so far. It is to be noted that the description regarding the following mechanism is not intended to limit the scope of the present invention.

As mentioned in Patent Document 1, when the amount of B is set lower than that in the standard R-T-B based sintered magnet (set lower than the amount of B in a stoichiometric ratio of an $R_2T_{14}B$ type compound) and Ga is added, a transition metal-rich phase (R-T-Ga phase) is formed, thus making it possible to obtain higher $H_{cJ}$. However, as a result of a study of the inventors of the present invention, it has been found that the R-T-Ga phase also has slight magnetism in sometimes and, if the R-T-Ga phase excessively exists on the grain boundary in the R-T-B based sintered magnet, particularly the grain boundary existing between two main phases (hereinafter sometimes referred to as "grain boundary between two grains") which is considered to mainly exert an influence on $H_k/H_{cJ}$, $H_k/H_{cJ}$ is reduced. There is a need to form the R-T-Ga phase so as to obtain high $H_k/H_{cJ}$, but the formation amount thereof must be suppressed.

As a result of a study of the inventors of the present invention, it has also been found that, in the case of the amount of B of the standard R-T-B based sintered magnet (the amount of B is more than that in a stoichiometric ratio of an $R_2T_{14}B$ type compound), the R-T-Ga phase is not easily formed, and that the boride of Ti is not easily formed in the stage of the raw material, but is easily formed during subsequent sintering and/or heat treatment. In conclusion, it is considered that the amount of B is set at the amount of B of the standard R-T-B based sintered magnet and Ti in a specific range is added, thus making it possible to form the R-T-Ga phase mainly during sintering and/or heat treatment (the boride of Ti is formed during sintering and/or heat treatment, thereby setting the amount of $B_{eff}$ lower than the total amount of B in the standard R-T-B based sintered magnet) and to suppress formation of the R-T-Ga phase in the stage of the raw material. Therefore, it becomes possible to suppress formation of the R-T-Ga phase compared to the case where the amount of B is set lower than the amount of B of the standard R-T-B based sintered magnet from the first, thus making it possible to obtain an R-T-B based sintered magnet having high $B_r$ and high $H_{cJ}$ and having high $H_k/H_{cJ}$.

[R-T-B Based Sintered Magnet]

An embodiment according to the present invention is directed to an R-T-B based sintered magnet including:

R (R is at least one of rare-earth elements, and indispensably contains Nd and a heavy rare-earth element RH (at least one of Dy, Tb, Gd, and Ho)): 27.5 to 34.0% by mass, RH: 2 to 10% by mass,
B: 0.89 to 0.95% by mass,
Ti: 0.1 to 0.2% by mass,
Ga: 0.3 to 0.7% by mass,
Cu: 0.07 to 0.50% by mass,
Al: 0.05 to 0.50% by mass,
M (M is Nb and/or Zr): 0 to 0.3% by mass, balance T (T is a transition metal element and indispensably contains Fe), and inevitable impurities, the following inequality expressions (1), (2), and (3) being satisfied:

$$[T]-72.3([B]-0.45[Ti])>0 \quad (1)$$

$$([T]-72.3([B]-0.45[Ti]))/55.85<13[Ga]/69.72 \quad (2)$$

$$[Ga] \geq [Cu] \quad (3)$$

where [T] is the content of T expressed in terms of % by mass, [B] is the content of B expressed in terms of % by mass, [Ti] is the content of Ti expressed in terms of % by mass, [Ga] is the content of Ga expressed in terms of % by mass, and [Cu] is the content of Cu expressed in terms of % by mass.

R is at least one of rare-earth elements, and indispensably contains Nd and heavy rare-earth element RH (at least one of Dy, Tb, Gd, and Ho). The content of R is in a range of 27.5 to 34.0% by mass. When the content of R is less than 27.5% by mass, a liquid phase may not be sufficiently formed in the sintering process, so that the sintered magnet cannot be made dense sufficiently. Meanwhile, when the content of R exceeds 34.0% by mass, the ratio of the main phase may decrease, failing to obtain high $B_r$. The content of RH accounts for 2 to 10% by mass of the entire R-T-B based sintered magnet. When the content of RH is less than 2% by mass, high $H_{cJ}$ may not be obtained and, when the content exceeds 10% by mass, $B_r$ may be reduced. The "content of RH" means the content of RH included in R mentioned above. Namely, the "content of RH" is included in the "content of R".

The amount of B is in a range of 0.89 to 0.95% by mass. When the amount of B is less than 0.89% by mass, $B_r$ may be reduced and, when the amount exceeds 0.95% by mass, high $H_{cJ}$ may not be obtained because of too small formation amount of the R-T-Ga phase. B can be partially substituted with C.

The content of Ti is in a range of 0.1 to 0.2% by mass. The boride of Ti is formed by including Ti, and the amount of $B_{eff}$ is set lower than the total amount of the standard R-T-B based sintered magnet by satisfying the inequality expression (1) mentioned below, thus making it possible to obtain a R-T-B based sintered magnet having high $H_k/H_{cJ}$. When the content of Ti is less than 0.1% by mass, high $H_k/H_{cJ}$ may not be obtained and, when the content of Ti exceeds 0.2% by mass, unnecessary Ti may exist, leading to a reduction in $B_r$. The content of Ti is preferably 0.1% by mass or more and less than 0.15% by mass. It is possible to obtain higher $B_r$.

The content of Ga is in a range of 0.3 to 0.7% by mass. Each content of B and Ti is set in the above range and the below-mentioned inequality expressions (1), (2), and (3) are satisfied, and Ga is included in the amount of 0.3 to 0.7% by mass to form the R-T-Ga phase located on a grain boundary portion of a main phase, thus making it possible to obtain high $B_r$ and high $H_{cJ}$. When the content of Ga is less than 0.3% by mass, high $H_{cJ}$ may not be obtained because of too small formation amount of the R-T-Ga phase. When the content exceeds 0.7% by mass, the formation amount of the R-T-Ga phase may be too large and unnecessary Ga may exist, leading to a reduction in $B_r$. Here, the R-T-Ga phase is typically a $Nd_6Fe_{13}Ga$ compound. The $R_6T_{13}Ga$ compound has a $La_6Co_{11}Ga_3$ type crystal structure. The $R_6T_{13}Ga$ compound is sometimes a $R_6T_{13-\delta}Ga_{1+\delta}$ compound depending on the state thereof. When Cu, Al, and Si are included in the R-T-B based sintered magnet, the compound is sometimes $R_6T_{13-\delta}(Ga_{1-x-y-z}Cu_xAl_ySi_z)_{1+\delta}$.

The content of Cu is in a range of 0.07 to 0.50% by mass. When the content of Cu is less than 0.07% by mass, high $H_{cJ}$ may not be obtained and, when the content exceeds 0.50% by mass, $B_r$ may be reduced.

Al may also be included to the extent to be usually included (0.05% by mass or more and 0.5% by mass or less). $H_{cJ}$ can be improved by including Al. In the production process, 0.05% by mass or more of Al is usually included as inevitable impurities, and may be included in the total amount (the amount of Al included as inevitable impurities and the amount of intentionally added Al) of 0.50% by mass or less.

It has generally been known that abnormal grain growth of crystal grains during sintering is suppressed by including Nb and/or Zr in the R-T-B based sintered magnet. Also in the present invention, Nb and/or Zr may be included in the total amount of 0.3% by mass or less (namely, at least one of Nb and Zr may be included, and the total amount of Nb and Zr is 0.3% by mass or less). When the total content of Nb and/or Zr exceeds 0.3% by mass, a volume fraction of the main phase may be decreased by the existence of unnecessary Nb and/or Zr, leading to a reduction in $B_r$.

Balance is T (T is a transition metal element and indispensably contains Fe), and the below-mentioned inequality expression (1) and (2) are satisfied. Fe preferably accounts for 90% by mass or more of T. A transition metal element other than Fe includes, for example, Co. The amount of substitution (content) of Co preferably accounts for 2.5% or less of the entire T in mass ratio. It is not preferred that the amount of substitution of Co accounts for more than 10% of the entire T because of a reduction in $B_r$. The R-T-B based sintered magnet of the present embodiment can include, as inevitable impurities included usually in a didymium alloy (Nd—Pr), electrolytic iron, ferro-boron, and the like, Cr, Mn, Si, La, Ce, Sm, Ca, Mg and the like. Examples of inevitable impurities in the production process include O (oxygen), N (nitrogen), C (carbon) and the like. The sintered magnet may also include a small amount V, Ni, Mo, Hf, Ta, W and the like.

The present embodiment satisfies the inequality expression (1), the inequality expression (2), and the inequality expression (3). By satisfying the inequality expression (1), the amount of $B_{\it eff}$ is set lower than the amount of B of the standard R-T-B based sintered magnet (set lower than the amount of B in a stoichiometric ratio of an $R_2T_{14}B$ type compound). In the present embodiment, a boride (typically, $TiB_2$) is formed by adding Ti. Therefore, the amount of B (amount of $B_{\it eff}$) obtained by subtracting the amount of B ([Ti]/47.867 (atomic weight of Ti)×2) consumed by $TiB_2$ from the total amount of B ([B]/10.811 (atomic weight of B)) of the R-T-B based sintered magnet is [B]−0.45[Ti] in the inequality expression (1). In the present embodiment, the amount of $B_{\it eff}$ is set lower than the amount of B in a stoichiometric ratio of an $R_2T_{14}B$ type compound. Namely, definition is performed by the inequality expression (1) such that [Fe]/55.85 (atomic weight of Fe) is set higher than $[B_{\it eff}]/10.811×14$, namely, (([B]−0.45[Ti])/10.811)×14 (([ ] means the content of an element mentioned inside the parentheses expressed in terms of % by mass and, for example, [Fe] means the content of Fe expressed in terms of % by mass). Definition is further performed by the inequality expression (2) such that the composition of the remaining Fe ([T]−72.3([B]−0.45[Ti])) is smaller than 13[Ga]/69.72 (atomic weight of Ga) in order to form the R-T-Ga phase (typically, $Nd_6Fe_{13}Ga$ compound) without forming the $R_2Fe_{17}$ phase which causes significant reduction in $H_{cJ}$ due to the remaining Fe. If the composition does not satisfy the inequality expression (1) and the inequality expression (2), reduction in $H_{cJ}$ may occur, failing to obtain high $H_k/H_{cJ}$.

$$[T]-72.3([B]-0.45[Ti])>0 \quad (1)$$

$$([T]-72.3([B]-0.45[Ti]))/55.85<13[Ga]/69.72 \quad (2)$$

Furthermore, the present embodiment satisfies the inequality expression (3).

$$[Ga]\geq[Cu] \quad (3)$$

In the invention of the present embodiment, the content of Ga is set higher than or equal to the content of Cu. When the content of Ga is lower than the content of Cu, the formation amount of the R-T-Ga phase decreases because of too small existence ratio of Ga in a grain boundary phase located on a grain boundary portion, leading to significant reduction in $H_{cJ}$, thus failing to obtain high $H_k/H_{cJ}$. Preferably, [Ga]≥1.5 [Cu]. Within the above range, higher $H_{cJ}$ can be obtained.

[Method for Producing R-T-B Based Sintered Magnet]

The R-T-B based sintered magnet of the present embodiment can be produced by using a known production method, and is fabricated by using a main alloy powder and an additional alloy powder according to the present embodiment to be mentioned below as a preferred aspect. This is because higher $H_{cJ}$ and $H_k/H_{cJ}$ can be obtained.

An example of a method for producing an R-T-B based sintered magnet of the present embodiment will be described. The method for producing an R-T-B based sintered magnet includes a step of obtaining an alloy powder, a molding step, a sintering step, and a heat treatment step. Each step will be described below.

(1) Step of Obtaining Alloy Powder

A kind of an alloy powder (single alloy powder) may be used as an alloy powder. A so-called two-alloy method of obtaining an alloy powder (mixed alloy powder) by mixing two or more kinds of alloy powders may be used to obtain an alloy powder with the composition of the present invention using the known method. Using a known method, an alloy powder with the composition of the present embodiment can be obtained. It is particularly preferred to use a strip casting method among known methods. When using the two-alloy method, the main alloy powder is preferably obtained by using at least a strip casting method. This is because formation of a boride of Ti in the stage of the raw material can be more suppressed.

In the case of the single alloy powder, metals or alloys of the respective elements are prepared so as to obtain the above-mentioned composition, and a flaky alloy is produced from them using a strip casting method. The flaky alloy thus obtained is subjected to hydrogen grinding to obtain a coarsely pulverized powder having a size of 1.0 mm or less. Next, the coarsely pulverized powder is finely pulverized by a jet mill to obtain a finely pulverized powder (alloy powder) having a grain size D50 (value obtained by a laser diffraction method using an air flow dispersion method (median size on a volume basis)) of 3 to 7 μm. A known lubricant may be used as a pulverization assistant in a coarsely pulverized powder before jet mill pulverization, or an alloy powder during and after jet mill pulverization.

When using the mixed alloy powder, in preferred aspect, as shown below, one or more kinds of main alloy powders and one or more kinds of additional alloy powders are prepared first, and then one or more kinds of additional alloy powders are mixed with one or more kinds of main alloy powders in a specific mixing amount to obtain a mixed alloy powder.

Metals or alloys of the respective elements are prepared so as to obtain given compositions mentioned in detail below of the one or more kinds of main alloy powders and the one or more kinds of additional alloy powders. In the same manner as in the above-mentioned single alloy powder, flaky alloys are produced by a strip casting method and then the flaky alloys are subjected to hydrogen grinding to obtain coarsely pulverized powders. The thus obtained main alloy powder (coarsely pulverized powder of main alloy powder) and additional alloy powder (coarsely pulverized powder of additional alloy powder) are loaded in a V-type mixer, followed by mixing them to obtain a mixed alloy powder. When mixing in the stage of the coarsely pulverized powder in this way, the mixed alloy powder thus obtained is finely pulverized by a jet mill to obtain a finely pulverized powder, thus obtaining a mixed alloy powder. As a matter of course, the main alloy powder and the additional alloy powder may be respectively finely pulverized by a jet mill to obtain a finely pulverized powder, which is then mixed to obtain a mixed alloy powder. If a large amount of R of the additional alloy powder is mixed, since ignition easily occurs during fine pulverization, the main alloy powder and the additional alloy powder are preferably finely pulverized after mixing.

The main alloy powder and the additional alloy powder have each composition within the range mentioned in detail below. Plural kinds of main alloy powders and additional alloy powders may be used. In that case, the main alloy powder and additional alloy powder have each composition within the range mentioned in detail below.

[Main Alloy Powder]

A main alloy powder has, in a preferred aspect, the composition including:
R: 27.5 to 34.0% by mass,
RH: 2 to 10% by mass,
B: 0.89 to 0.97% by mass, Ti: 0 to 0.2% by mass (excluding 0% by mass when Ti accounts for 0% by mass in one or more kinds of additional alloy powders), Ga: 0 to 0.4% by mass, Cu: 0.07 to 0.50% by mass, Al: 0.05 to 0.50% by mass, balance T, and inevitable impurities.

The content of R is in a range of 27.5 to 34.0% by mass. When the content of R is less than 27.5% by mass, a liquid phase may not be sufficiently formed in the sintering process, so that the sintered magnet cannot be made dense sufficiently. Whereas, when the content of R exceeds 34.0% by mass, the ratio of the main phase may be reduced in the R-T-B based sintered magnet thus obtained finally, failing to obtain high $B_r$. The content of RH accounts for 2 to 10% by mass of the entire main alloy powder. When the content of RH is less than 2% by mass, high $H_{cJ}$ may not be obtained in the R-T-B based sintered magnet thus obtained finally. Whereas, when the content exceeds 10% by mass, $B_r$ may be reduced.

The amount of B is in a range of 0.89 to 0.97% by mass. When the amount of B is less than 0.89% by mass, $B_r$ may be reduced in the R-T-B based sintered magnet thus obtained finally. Whereas, when the content exceeds 0.97% by mass, high $H_{cJ}$ may not be obtained because of too small formation amount of the R-T-Ga phase. B can be partially substituted with C.

The content of Ti is in a range of 0 to 0.2% by mass. When the content of Ti exceeds 0.2% by mass, unnecessary Ti may exist, leading to a reduction in $B_r$ in the R-T-B based sintered magnet thus obtained finally. When Ti is not included in the main alloy powder, Ti is included in an additional alloy powder such that the content of Ti in the R-T-B based sintered magnet thus obtained finally falls within a range of 0.1 to 0.2% by mass.

The content of Ga is in a range of 0 to 0.4% by mass. When the content of Ga exceeds 0.4% by mass, unnecessary Ga may exist, leading to a reduction in $B_r$ in the R-T-B based sintered magnet thus obtained finally. When Ga is not included in the main alloy powder, Ga is included in an additional alloy powder in a range of 0.7 to 12% by mass such that the content of Ga in the R-T-B based sintered magnet thus obtained finally falls within a range of 0.3 to 0.7% by mass.

The content of Cu is in a range of 0.07 to 0.50% by mass. When the content of Cu is less than 0.07% by mass, high $H_{cJ}$ may not be obtained in the R-T-B based sintered magnet thus obtained finally. Whereas, when the content exceeds 0.50% by mass, $B_r$ may be reduced.

Al (0.05% by mass or more and 0.5% by mass or less) may also be included to the extent to be usually included. $H_{cJ}$ can be improved by including Al. In the production process, 0.05% by mass or more of Al is usually included as inevitable impurities, and may be included in the total amount (the amount of Al included as inevitable impurities and the amount of intentionally added Al) of 0.5% by mass or less.

The content of Ga in the main alloy powder is lower than that in the additional alloy powder. Formation of the R-T-Ga phase in the main alloy powder can be suppressed by lowering the content of Ga in the main alloy powder.

[Additional Alloy Powder]

An additional alloy powder has, in a preferred aspect, the composition including:

R1 (R1 is at least one of rare-earth elements other than a heavy rare-earth element RH, and indispensably contains Nd): 32 to 66% by mass, B: 0.3 to 0.9% by mass, Ti: 0 to 4% by mass (excluding 0% by mass when Ti accounts for 0% by mass in one or more kinds of main alloy powders), Ga: 0.7 to 12% by mass, Cu: 0 to 4% by mass, Al: 0 to 10% by mass, balance T, and inevitable impurities, the composition satisfying the following inequality expression (4).

$$[T] \leq 72.4[B] \qquad (4)$$

With the above composition, the additional alloy powder has the composition in which the amounts of R and B are relatively more than those of the $R_2T_{14}B$ stoichiometric composition. Therefore, formation of the R-T-Ga phase can be suppressed.

R1 is at least one of rare-earth elements other than a heavy rare-earth element RH, and indispensably contains Nd. The heavy rare-earth element RH is not included in the additional alloy powder. When the heavy rare-earth element RH is included in the additional alloy powder, the heavy rare-earth element RH may not be included in the main phase, failing to improve $H_{cJ}$, and $B_r$ may be reduced by including unnecessary heavy rare-earth element RH on a grain boundary. The content of R1 is in a range of 32 to 66% by mass. When the content of R1 is less than 32% by mass, high $H_{cJ}$ may not be obtained in the R-T-B based sintered magnet thus obtained finally. When the content exceeds 66% by mass, a problem of oxidation arises because of too large amount of R to thereby cause deterioration of magnetic properties and risk of ignition, resulting in production problems.

The content of B is in a range of 0.3 to 0.9% by mass. When the content of B is less than 0.3% by mass, the R-T-Ga phase may be easily formed since the amount of B is relatively too small to the $R_2T_{14}B$ stoichiometric composition. Whereas, when the content exceeds 0.9% by mass, the amount of B is relatively large to the $R_2T_{14}B$ stoichiometric composition and thus the $R_1T_4B_4$ phase may be easily formed.

The content of Ti is in a range of 0 to 4% by mass. When the content of Ti exceeds 4% by mass, it becomes difficult to pulverize during coarsely pulverization and finely pulverization, resulting in production problems. When Ti is not included in the additional alloy powder, Ti is included in the main alloy powder such that the content of Ti in the R-T-B based sintered magnet thus obtained finally falls within a range of 0.1 to 0.2% by mass.

The content of Ga is in a range of 0.7 to 12% by mass. When the content of Ga is less than 0.7% by mass, high $H_{cJ}$ may not be obtained because of too small formation amount of the R-T-Ga phase in the R-T-B based sintered magnet thus obtained finally. Whereas, when the content exceeds 12% by mass, Ga may be segregated, thus failing to obtain an R-T-B based sintered magnet having high $H_{cJ}$.

The content of Cu is in a range of 0 to 4% by mass, and the content of Al is in a range of 0 to 10% by mass. When the content of Cu exceeds 4 by mass or the content of Al exceeds 10% by mass, $B_r$ may be reduced.

The additional alloy powder satisfies the relationship of the inequality expression (4). The composition in which the amount of B is excessive rather than than that of T(Fe) relative to the $R_2T_{14}B$ stoichiometric composition is obtained by satisfying the relationship of the inequality expression (4). Therefore, the amount of B is more than the stoichiometric ratio of the $R_2T_{14}B$ type compound, thus making it possible to suppress formation of the R-T-Ga phase.

$$[T] \leq 72.4[B] \qquad (4)$$

It becomes possible for the main alloy powder and the additional alloy powder of the present embodiment to further suppress formation of the R-T-Ga phase as compared with the case of producing from a single alloy powder, thus making it possible to obtain higher $H_{cJ}$ and $H_k/H_{cJ}$.

The above-mentioned main alloy powder and additional alloy powder are added at a mixing ratio of the additional alloy powder in a range of 0.5% by mass or more and 20% by mass or less based on 100% by mass of the mixed alloy powder. The R-T-B based sintered magnet produced by setting the mixing amount of the additional alloy powder in the above range can achieve higher $H_{cJ}$. Namely, the main alloy powder means an alloy powder with the above-mentioned composition range of the main alloy powder, which accounts for 80% by mass or more and 99.5% by mass or less of the mixed alloy powder after mixing. When two or more kinds of main alloy powders are used, each alloy powder has the above-mentioned composition range of the main alloy powder, and the total amount of two or more kinds of main alloy powders accounts for 80% by mass or more and 99.5% by mass or less of the mixed alloy powder after mixing.

(2) Molding Step

Using the alloy powder thus obtained (single alloy powder or mixed alloy powder), molding under a magnetic field is performed to obtain a molded body. The molding under a magnetic field may be performed using any known methods of molding under a magnetic field including a dry molding method in which a dry alloy powder is loaded in a cavity of a mold and then molded while applying a magnetic field, and a wet molding method in which a slurry (containing the alloy powder dispersed therein) is injected in a cavity of a mold and then molded while discharging a dispersion medium of the slurry.

(3) Sintering Step

The molded body is sintered to obtain a sintered body. A known method can be used to sinter the molded body. To prevent oxidation from occurring due to an atmosphere during sintering, sintering is preferably performed in a vacuum atmosphere or an atmospheric gas. It is preferable to use, as the atmospheric gas, an inert gas such as helium or argon.

(4) Heat Treatment Step

The sintered body thus obtained is preferably subjected to a heat treatment for the purpose of improving magnetic properties. Known conditions can be employed for the heat treatment temperature and the heat treatment time. To adjust the size of the sintered magnet, the magnet may be subjected to machining such as grinding. In that case, the heat treatment may be performed before or after machining. The sintered magnet may also be subjected to a surface treatment. The surface treatment may be a known surface treatment, and it is possible to perform surface treatments, for example, Al vapor deposition, Ni electroplating, resin coating, and the like.

Aspects of the present invention will be described in more detail by way of Examples, but the present invention is not limited thereto.

Example 1

After weighing the respective elements so as to obtain a given composition of an R-T-B based sintered magnet shown in Table 1, alloys were produced by a strip casting method. Each of alloys thus obtained was coarsely pulverized by a hydrogen grinding method to obtain a coarsely pulverized powder. The coarsely pulverized powder was finely pulverized by a jet mill to produce a finely pulverized powder having a grain size D50 (value obtained by a laser diffraction method using an air flow dispersion method (median size on a volume basis)) of 4 μm. To the finely pulverized powder, zinc stearate was added as a lubricant in the proportion of 0.05 part by mass based on 100 parts by mass of the finely pulverized powder, followed by mixing and further molding in a magnetic field to obtain a molded body. A molding device used was a so-called perpendicular magnetic field molding device (transverse magnetic field molding device) in which a magnetic field application direction and a pressuring direction are perpendicular to each other. The molded body thus obtained was sintered by holding in vacuum at 1,050° C. to 1,090° C. for 4 hours according to the composition to obtain an R-T-B based sintered magnet. The R-T-B based sintered magnet had a density of 7.5 Mg/m$^3$ or more. The analysis results of components of the R-T-B based sintered magnet thus obtained are shown in Table 1. The respective components in Table 1 were measured using high-frequency inductively coupled plasma emission spectrometry (ICP-OES). O (amount of oxygen) was measured by a gas fusion-infrared absorption method, N (amount of nitrogen) was measured by a gas fusion-thermal conductivity method, and C (amount of carbon) was measured by a combustion infrared absorption method, using a gas analyzer. In Table 1, the value of the total amount of Nd, Pr, and Dy is TRE (namely, the amount of R), and the case where the inequality expressions (1) and (2) of the present invention are satisfied was rated as "Pass", whereas, the case where the inequality expressions (1) and (2) of the present invention are not satisfied was rated as "Fail". The same shall apply to Table 3. Regarding the amount of each component in Table 1, the value of the place smaller than the minimum place of the numerical value inscribed is omitted. Therefore, the calculation results of the inequality expressions (1) and (2) are sometimes slightly different from the value to be determined from the numerical value inscribed in Table 1. For example, regarding the amount of Ga of ample No. 1, the numerical values beyond the third decimal point is omitted. The same shall apply to the analysis results of the below-mentioned components in Tables 3, 5, 6, and 8. All samples except for comparative sample No. 13 in Table 3 and comparative sample No. 40 in Table 8 satisfy the inequality expression (3) of the present invention.

TABLE 1

| No. | Composition of R—T—B-based sintered magnet (% by mass) | | | | | | | | | | | | | | Inequality expression (1) | Inequality expression (2) | |
|---|---|---|---|---|---|---|---|---|---|---|---|---|---|---|---|---|---|
| | TRE | Nd | Pr | Dy | B | Co | Al | Cu | Ga | Ti | Fe | O | N | C | | | |
| 1 | 32.63 | 19.60 | 6.60 | 6.43 | 0.87 | 0.91 | 0.21 | 0.22 | 0.43 | 0.00 | 64.73 | 0.42 | 0.01 | 0.07 | Pass | Pass | Comparative Example |
| 2 | 32.46 | 19.50 | 6.54 | 6.43 | 0.94 | 0.91 | 0.21 | 0.23 | 0.45 | 0.16 | 64.65 | 0.42 | 0.01 | 0.07 | Pass | Pass | Present invention |
| 3 | 32.40 | 20.54 | 6.78 | 5.08 | 0.91 | 0.92 | 0.21 | 0.24 | 0.45 | 0.07 | 64.81 | 0.41 | 0.01 | 0.07 | Pass | Pass | Comparative Example |
| 4 | 30.67 | 19.15 | 6.45 | 5.07 | 0.92 | 0.90 | 0.14 | 0.20 | 0.43 | 0.10 | 66.65 | 0.09 | 0.04 | 0.09 | Pass | Pass | Present invention |

The R-T-B based sintered magnet obtained after sintering was subjected to a heat treatment of retaining at 800° C. for 2 hours and cooling to room temperature, followed by retention at 500° C. for 2 hours and cooling to room temperature. The sintered magnet thus obtained after the heat treatment was machined to produce samples of 7 mm in length×7 mm in width×7 mm in thickness, and then magnetic properties of each sample were measured by a B-H tracer. The measurements results are shown in Table 2.

In $H_k/H_{cJ}$, $H_k$ is a value of H (the same shall apply hereinafter) at a position where J becomes the value of $0.9 \times J_r$ ($J_r$ is residual magnetization, $J_r = B_r$) in the second quadrant of a J (magnitude of magnetization)-H (intensity of magnetic field) curve. It has been known that $H_k/H_{cJ}$ is reduced as the amount of RH is increased. Therefore, a comparison is made on $H_k/H_{cJ}$ between samples in which the content of RH is nearly the same.

TABLE 2

| No. | $B_r$ (T) | $H_{cJ}$ (kA/m) | $H_k$ (kA/m) | $H_k/H_{cJ}$ | |
|---|---|---|---|---|---|
| 1 | 1.192 | 2384 | 2142 | 0.898 | Comparative Example |
| 2 | 1.179 | 2412 | 2246 | 0.931 | Present invention |
| 3 | 1.213 | 2161 | 1902 | 0.880 | Comparative Example |
| 4 | 1.264 | 2249 | 2065 | 0.918 | Present invention |

As shown in Table 2, when a comparison is made between samples Nos. 1 and 2 (6.43% by mass) and samples Nos. 3 and 4 (about 5% by mass) in which the content of RH (Dy) is almost the same, high $H_k/H_{cJ}$ is obtained in the present invention (samples Nos. 2 and 4).

Example 2

In the same manner as in Example 1, except that mixing is performed such that the composition of the R-T-B based sintered magnet becomes each composition of samples Nos. 5 to 26 shown in Table 3, an R-T-B based sintered magnet was produced.

TABLE 3

| No. | Composition of R—T—B-based sintered magnet (% by mass) | | | | | | | | | | | | | | Inequality expression (1) | Inequality expression (2) | |
|---|---|---|---|---|---|---|---|---|---|---|---|---|---|---|---|---|---|
| | TRE | Nd | Pr | Dy | B | Co | Al | Cu | Ga | Ti | Fe | O | N | C | | | |
| 5 | 32.79 | 16.34 | 5.41 | 11.04 | 0.91 | 0.91 | 0.20 | 0.23 | 0.45 | 0.12 | 64.39 | 0.42 | 0.01 | 0.07 | Pass | Pass | Comparative Example |
| 6 | 32.24 | 22.78 | 7.62 | 1.84 | 0.91 | 0.91 | 0.20 | 0.23 | 0.45 | 0.11 | 64.95 | 0.41 | 0.01 | 0.07 | Pass | Pass | Comparative Example |
| 7 | 30.99 | 20.96 | 6.95 | 3.08 | 0.93 | 0.90 | 0.14 | 0.20 | 0.43 | 0.11 | 66.30 | 0.09 | 0.04 | 0.09 | Pass | Pass | Present invention |
| 8 | 32.30 | 22.12 | 7.24 | 2.94 | 0.92 | 0.91 | 0.20 | 0.23 | 0.45 | 0.12 | 64.87 | 0.41 | 0.01 | 0.07 | Pass | Pass | Present invention |
| 9 | 32.20 | 22.34 | 7.44 | 2.42 | 0.91 | 0.91 | 0.20 | 0.23 | 0.45 | 0.10 | 65.00 | 0.41 | 0.01 | 0.07 | Pass | Pass | Present invention |
| 10 | 32.56 | 20.60 | 6.88 | 5.08 | 0.97 | 0.91 | 0.21 | 0.24 | 0.45 | 0.12 | 64.54 | 0.42 | 0.01 | 0.08 | Fail | Pass | Comparative Example |
| 11 | 32.73 | 20.64 | 6.88 | 5.21 | 0.95 | 0.92 | 0.20 | 0.20 | 0.44 | 0.10 | 64.46 | 0.41 | 0.01 | 0.07 | Fail | Pass | Comparative Example |
| 12 | 32.59 | 20.63 | 6.88 | 5.09 | 0.92 | 0.91 | 0.21 | 0.24 | 0.74 | 0.1 | 64.28 | 0.41 | 0.01 | 0.07 | Pass | Pass | Comparative Example |
| 13 | 32.72 | 20.70 | 6.89 | 5.13 | 0.92 | 0.92 | 0.21 | 0.23 | 0.16 | 0.12 | 64.73 | 0.40 | 0.01 | 0.07 | Pass | Fail | Comparative Example |
| 14 | 32.66 | 20.68 | 6.89 | 5.10 | 0.91 | 0.91 | 0.22 | 0.04 | 0.42 | 0.12 | 64.72 | 0.44 | 0.01 | 0.06 | Pass | Pass | Comparative Example |
| 15 | 32.61 | 20.62 | 6.82 | 5.17 | 0.90 | 0.92 | 0.20 | 0.20 | 0.24 | 0.11 | 64.82 | 0.41 | 0.01 | 0.07 | Pass | Fail | Comparative Example |
| 16 | 32.87 | 20.80 | 6.94 | 5.13 | 0.87 | 0.91 | 0.20 | 0.23 | 0.45 | 0.11 | 64.36 | 0.41 | 0.01 | 0.07 | Pass | Fail | Comparative Example |
| 17 | 32.57 | 20.60 | 6.82 | 5.15 | 0.93 | 0.91 | 0.21 | 0.23 | 0.48 | 0.19 | 64.49 | 0.41 | 0.01 | 0.07 | Pass | Pass | Present invention |

TABLE 3-continued

| | Composition of R—T—B-based sintered magnet (% by mass) | | | | | | | | | | | | | Inequality expression (1) | Inequality expression (2) | |
|---|---|---|---|---|---|---|---|---|---|---|---|---|---|---|---|---|
| No. | TRE | Nd | Pr | Dy | B | Co | Al | Cu | Ga | Ti | Fe | O | N | C | | | |
| 18 | 32.81 | 20.69 | 6.87 | 5.24 | 0.92 | 0.92 | 0.20 | 0.20 | 0.42 | 0.13 | 64.40 | 0.41 | 0.01 | 0.07 | Pass | Pass | Present invention |
| 19 | 32.64 | 20.65 | 6.88 | 5.10 | 0.91 | 0.92 | 0.21 | 0.24 | 0.60 | 0.12 | 64.38 | 0.41 | 0.01 | 0.07 | Pass | Pass | Present invention |
| 20 | 32.70 | 20.70 | 6.89 | 5.11 | 0.89 | 0.91 | 0.20 | 0.23 | 0.45 | 0.10 | 64.52 | 0.40 | 0.01 | 0.07 | Pass | Pass | Present invention |
| 21 | 32.69 | 20.70 | 6.89 | 5.10 | 0.90 | 0.91 | 0.20 | 0.23 | 0.36 | 0.10 | 64.61 | 0.40 | 0.01 | 0.07 | Pass | Pass | Present invention |
| 22 | 32.69 | 20.70 | 6.89 | 5.10 | 0.89 | 0.91 | 0.20 | 0.23 | 0.25 | 0.10 | 64.73 | 0.40 | 0.01 | 0.07 | Pass | Fail | Comparative Example |
| 23 | 32.46 | 19.50 | 6.54 | 6.43 | 0.96 | 0.91 | 0.21 | 0.23 | 0.45 | 0.16 | 64.63 | 0.42 | 0.01 | 0.07 | Pass | Pass | Comparative Example |
| 24 | 32.69 | 19.57 | 6.64 | 6.48 | 0.94 | 0.91 | 0.20 | 0.23 | 0.50 | 0.24 | 64.29 | 0.39 | 0.01 | 0.08 | Pass | Pass | Comparative Example |
| 25 | 32.80 | 19.70 | 6.64 | 6.46 | 0.88 | 0.91 | 0.21 | 0.23 | 0.49 | 0.10 | 64.39 | 0.42 | 0.01 | 0.07 | Pass | Pass | Comparative Example |
| 26 | 32.55 | 19.56 | 6.56 | 6.44 | 0.91 | 0.91 | 0.20 | 0.23 | 0.45 | 0.10 | 64.65 | 0.41 | 0.01 | 0.07 | Pass | Pass | Present invention |

The R-T-B based sintered magnet thus obtained was machined in the same manner as in Example 1, and then magnetic properties were determined by measuring in the same manner as in Example 1. The results are shown in Table 4.

TABLE 4

| No. | $B_r$ (T) | $H_{cJ}$ (kA/m) | $H_k$ (kA/m) | $H_k/H_{cJ}$ | |
|---|---|---|---|---|---|
| 5 | 1.055 | 3152 | 2422 | 0.768 | Comparative Example |
| 6 | 1.304 | 1645 | 1572 | 0.956 | Comparative Example |
| 7 | 1.311 | 1931 | 1785 | 0.925 | Present invention |
| 8 | 1.292 | 1822 | 1684 | 0.924 | Present invention |
| 9 | 1.293 | 1753 | 1663 | 0.949 | Present invention |
| 10 | 1.226 | 2082 | 1973 | 0.948 | Comparative Example |
| 11 | 1.212 | 2028 | 1912 | 0.943 | Comparative Example |
| 12 | 1.174 | 2188 | 2016 | 0.921 | Comparative Example |
| 13 | 1.234 | 2038 | 1767 | 0.867 | Comparative Example |
| 14 | 1.187 | 2065 | 1884 | 0.912 | Comparative Example |
| 15 | 1.202 | 2174 | 1924 | 0.885 | Comparative Example |
| 16 | 1.204 | 2019 | 1785 | 0.884 | Comparative Example |
| 17 | 1.190 | 2213 | 2020 | 0.913 | Present invention |
| 18 | 1.217 | 2206 | 2016 | 0.914 | Present invention |
| 19 | 1.200 | 2191 | 2012 | 0.918 | Present invention |
| 20 | 1.206 | 2154 | 1978 | 0.918 | Present invention |
| 21 | 1.206 | 2100 | 1978 | 0.942 | Present invention |
| 22 | 1.208 | 1997 | 1780 | 0.891 | Comparative Example |
| 23 | 1.184 | 2227 | 2087 | 0.937 | Comparative Example |
| 24 | 1.162 | 2378 | 2204 | 0.927 | Comparative Example |
| 25 | 1.172 | 2191 | 1927 | 0.880 | Comparative Example |
| 26 | 1.178 | 2404 | 2203 | 0.917 | Present invention |

As shown in Table 4, when a comparison is made between samples Nos. 10 to 22 in which the content of RH is almost the same (Dy: about 5.1 to 5.25%), samples Nos. 17 to 21 of the present invention achieve high magnetic properties of $B_r$ of 1.190T or more, $H_{cJ}$ of 2100 kA/m or more, and $H_k/H_{cJ}$ of 0.913 or more. Meanwhile, samples Nos. 10 to 16 and 22 in which B (samples Nos. 10 and 16), Ga (samples Nos. 12, 13, 15, and 22), Cu (sample No. 14), inequality expression (1) (samples Nos. 10 and 11), and the inequality expression (2) (samples Nos. 13, 15, and 16), which deviates from the scope of the present invention, cannot achieve high magnetic properties of $B_r$ of 1.190T or more, $H_{cJ}$ of 2100 kA/m or more, and $H_k/H_{cJ}$ of 0.913 or more. As is apparent from samples Nos. 21 and 22 in which the composition is almost the same except that the content of Ga differs by 0.11% by mass, cannot achieve high $H_{cJ}$ when the content of Ga is less than 0.3% by mass. Like samples Nos. 23 to 26 in which the content of RH is almost the same (Dy: about 6.5%), sample No. 26 of the present invention can achieve high magnetic properties of $B_r$ of 1.178T or more, $H_{cJ}$ of 2404 kA/m or more, and $H_k/H_{cJ}$ of 0.917 or more as compared with samples Nos. 23 to 25 of comparative samples.

Example 3

After weighing the respective elements so as to obtain a given compositions of a main alloy powder or an additional alloy powder shown in Table 5, alloys were produced by a strip casting method. The obtained flake raw-material alloy was subjected to hydrogen embrittlement under a hydrogen pressurized atmosphere, and a dehydrogenation process was performed on the alloy by heating to 550° C. in vacuum and then cooling, thereby producing a coarse pulverized powder. The coarsely pulverized powder of the thus obtained additional alloy and the coarsely pulverized powder of the main alloy were loaded in a V-type mixer under the conditions shown in Table 6, followed by mixing to obtain a mixed alloy powder. For example, sample No. 30 in Table 6 is produced by using a mixed alloy powder prepared by mixing an Al alloy powder (main alloy powder) in Table 5 with a B1 alloy powder (additional alloy powder) to fabricate an R-T-B based sintered magnet, and the mixing amount of the additional alloy powder in the mixed alloy powder accounts for 5% by mass of 100% by mass of the mixed alloy powder. Likewise, samples Nos. 31 to 33 were fabricated by using mixed alloy powders in combination in the mixing amount of the additional alloy powder shown in Table 6. Then, 0.04% by mass of a zinc stearate was added as a lubricant and mixed into 100% by mass of the coarse pulverized powder obtained, followed by dry pulverization under an airflow of nitrogen gas using the airflow pulverizer (jet mill device), thereby producing fine pulverized powder (as a mixed alloy powder) having a grain size D50 of 4 μm. The mixed alloy powder thus obtained was subjected to molding and sintering under the same conditions as in Example 1. The analysis results of components of the R-T-B based sintered magnet thus obtained are shown in Table 6. The respective components in Table 6 were measured in the same manner as in Example 1. The case where the inequality expression (4) of the present invention is satisfied was rated as "Pass" in Table 5.

TABLE 5

| Alloy powder | Type of alloy | Composition of alloy powder (% by mass) | | | | | | | | | | Inequality expression (4) |
|---|---|---|---|---|---|---|---|---|---|---|---|---|
| | | TRE | Nd | Pr | Dy | B | Co | Al | Cu | Ga | Ti | Fe | |
| A1 | Main alloy powder | 31.80 | 19.76 | 6.57 | 5.48 | 0.93 | 0.89 | 0.23 | 0.22 | 0.13 | 0.00 | 65.80 | — |
| A2 | Main alloy powder | 31.70 | 19.70 | 6.54 | 5.47 | 0.90 | 0.90 | 0.23 | 0.22 | 0.13 | 0.00 | 65.93 | — |
| A3 | Main alloy powder | 32.02 | 19.90 | 6.65 | 5.47 | 0.96 | 0.91 | 0.10 | 0.21 | 0.12 | 0.14 | 65.55 | — |
| A4 | Main alloy powder | 32.05 | 19.90 | 6.67 | 5.48 | 0.89 | 0.92 | 0.10 | 0.21 | 0.13 | 0.14 | 65.57 | — |
| B1 | Additional alloy powder | 61.63 | 46.34 | 15.28 | 0.01 | 0.38 | 0.90 | 0.12 | 0.24 | 7.34 | 3.15 | 26.25 | Pass |
| B2 | Additional alloy powder | 56.74 | 42.80 | 13.91 | 0.03 | 0.48 | 0.88 | 0.19 | 0.21 | 6.82 | 2.40 | 32.29 | Pass |
| B3 | Additional alloy powder | 56.31 | 42.55 | 13.75 | 0.01 | 0.50 | 0.87 | 0.20 | 0.17 | 6.91 | 0.00 | 35.06 | Pass |

TABLE 6

| No. | Composition of R—T—B-based sintered magnet (% by mass) | | | | | | | | | | | | | | Mixed alloy powder | Mixing amount of additional alloy powder (% by mass) |
|---|---|---|---|---|---|---|---|---|---|---|---|---|---|---|---|---|
| | TRE | Nd | Pr | Dy | B | Co | Al | Cu | Ga | Ti | Fe | O | N | C | | |
| 30 | 32.65 | 20.62 | 6.81 | 5.22 | 0.91 | 0.89 | 0.21 | 0.22 | 0.46 | 0.16 | 64.49 | 0.41 | 0.02 | 0.08 | A1 + B1 | 5% |
| 31 | 32.67 | 20.64 | 6.82 | 5.21 | 0.89 | 0.89 | 0.21 | 0.22 | 0.46 | 0.14 | 64.52 | 0.42 | 0.02 | 0.07 | A2 + B1 | 5% |
| 32 | 32.90 | 20.82 | 6.90 | 5.19 | 0.91 | 0.86 | 0.23 | 0.25 | 0.45 | 0.11 | 64.28 | 0.33 | 0.01 | 0.07 | A1 + B2 | 5% |
| 33 | 32.87 | 20.74 | 6.90 | 5.23 | 0.91 | 0.92 | 0.11 | 0.21 | 0.42 | 0.13 | 64.43 | 0.41 | 0.01 | 0.07 | A3 + A4 + B3 | 5% |

The R-T-B based sintered magnet thus obtained was machined in the same manner as in Example 1, and then magnetic properties were determined by measuring in the same manner as in Example 1. The results are shown in Table 7.

TABLE 7

| No. | $B_r$ (T) | $H_{cJ}$ (kA/m) | $H_k$ (kA/m) | $H_k/H_{cJ}$ | |
|---|---|---|---|---|---|
| 30 | 1.204 | 2249 | 2095 | 0.932 | Present invention |
| 31 | 1.215 | 2191 | 2018 | 0.921 | Present invention |
| 32 | 1.218 | 2226 | 2059 | 0.925 | Present invention |
| 33 | 1.211 | 2208 | 2063 | 0.935 | Present invention |

As shown in Table 7, samples Nos. 30 to 33 in which an R-T-B based sintered magnet is fabricated using the main alloy powder and the additional alloy powder of the present invention achieve high $H_{cJ}$ and $H_k/H_{cJ}$ as compared with sample No. 18 (with the composition which is almost the same as that of Nos. 30, 32, and 33) and No. 20 (with the composition which is almost the same as that of No. 31) of Example 2 fabricated from a single alloy with almost the same composition. Samples Nos. 31 to 33 (Ti: 0.11% by mass to 0.14% by mass) achieve higher $B_r$ than that of sample No. 30 (Ti: 0.16% by mass). Therefore, the content of Ti is preferably less than 0.15% by mass.

Example 4

In the same manner as in Example 1, except that mixing is performed such that the composition of the R-T-B based sintered magnet is the composition of samples Nos. 34 to 40 shown in Table 8, an R-T-B based sintered magnet was fabricated.

TABLE 8

| No. | Composition of R—T—B-based sintered magnet (% by mass) | | | | | | | | | | | |
|---|---|---|---|---|---|---|---|---|---|---|---|---|
| | TRE | Nd | Pr | Dy | B | Co | Al | Cu | Ga | Ti | Nb | Zr |
| 34 | 32.53 | 20.54 | 6.92 | 5.07 | 0.93 | 0.85 | 0.19 | 0.16 | 0.41 | 0.13 | 0.10 | 0.00 |
| 35 | 32.65 | 20.62 | 6.97 | 5.07 | 0.92 | 0.85 | 0.19 | 0.16 | 0.41 | 0.12 | 0.00 | 0.10 |
| 36 | 32.40 | 20.46 | 6.88 | 5.06 | 0.91 | 0.88 | 0.19 | 0.15 | 0.45 | 0.10 | 0.00 | 0.00 |
| 37 | 32.41 | 20.46 | 6.89 | 5.06 | 0.91 | 0.88 | 0.19 | 0.15 | 0.46 | 0.12 | 0.00 | 0.00 |
| 38 | 32.49 | 20.52 | 6.92 | 5.06 | 0.92 | 0.88 | 0.19 | 0.16 | 0.45 | 0.15 | 0.00 | 0.00 |
| 39 | 32.45 | 20.48 | 6.91 | 5.06 | 0.92 | 0.88 | 0.19 | 0.16 | 0.47 | 0.17 | 0.00 | 0.00 |
| 40 | 32.41 | 20.49 | 6.88 | 5.04 | 0.91 | 0.88 | 0.19 | 0.48 | 0.38 | 0.12 | 0.00 | 0.00 |

TABLE 8-continued

| | Composition of R—T—B-based sintered magnet (% by mass) | | | | Inequality expression (1) | Inequality expression (2) | |
|---|---|---|---|---|---|---|---|
| No. | Fe | O | N | C | | | |
| 34 | 64.70 | 0.41 | 0.01 | 0.07 | Pass | Pass | Present invention |
| 35 | 64.61 | 0.41 | 0.01 | 0.07 | Pass | Pass | Present invention |
| 36 | 64.92 | 0.41 | 0.01 | 0.07 | Pass | Pass | Present invention |
| 37 | 64.88 | 0.40 | 0.01 | 0.07 | Pass | Pass | Present invention |
| 38 | 64.76 | 0.41 | 0.01 | 0.07 | Pass | Pass | Present invention |
| 39 | 64.77 | 0.42 | 0.01 | 0.07 | Pass | Pass | Present invention |
| 40 | 64.63 | 0.40 | 0.01 | 0.08 | Pass | Pass | Comparative Example |

The R-T-B based sintered magnet thus obtained was machined in the same manner as in Example 1, and then magnetic properties were determined by measuring in the same manner as in Example 1. The results are shown in Table 9.

TABLE 9

| No. | Br (T) | HcJ (kA/m) | Hk (kA/m) | Hk/HcJ | |
|---|---|---|---|---|---|
| 34 | 1.205 | 2134 | 2001 | 0.938 | Present invention |
| 35 | 1.202 | 2179 | 2045 | 0.939 | Present invention |
| 36 | 1.212 | 2181 | 2004 | 0.919 | Present invention |
| 37 | 1.209 | 2183 | 2005 | 0.918 | Present invention |
| 38 | 1.206 | 2154 | 1979 | 0.919 | Present invention |
| 39 | 1.198 | 2145 | 1972 | 0.919 | Present invention |
| 40 | 1.188 | 1945 | 1760 | 0.905 | Comparative Example |

As shown in Table 9, even when Nb and Zr are included (samples Nos. 34 and 35), high magnetic properties of $B_r$ of 1.190T or more, $H_{cJ}$ of 2100 kA/m or more, and $H_k/H_{cJ}$ of 0.913 or more are obtained. As is apparent from samples Nos. 36 to 39 in which the composition is almost the same except that the content of Ti is different, high Br is obtained when the content of Ti is in a range of 0.1 to 0.15 (samples Nos. 36 to 38). Therefore, the content of Ti is preferably 0.1% by mass or more and less than 0.15% by mass. As is apparent from sample No. 40 in which the inequality expression (3) ([Ga]≥[Cu]) of the present invention deviates from the scope of the present invention, when the content of Ga is lower than the content of Cu, $H_{cJ}$ is significantly reduced, failing to obtain high $H_k/H_{cJ}$.

The present application claims priority on Japanese Patent Application No. 2015-127295 filed on Jun. 25, 2015 as a basic application, the disclosure of which is incorporated by reference herein.

The invention claimed is:

1. An R-T-B based sintered magnet comprising:
R (R is at least one of rare-earth elements, and indispensably contains Nd and a heavy rare-earth element RH (at least one of Dy, Tb, Gd, and Ho)): 27.5 to 34.0% by mass,
RH: 2 to 10% by mass,
B: 0.89 to 0.95% by mass,
Ti: 0.1 to 0.2% by mass,
Ga: 0.3 to 0.7% by mass,
Cu: 0.07 to 0.50% by mass,
Al: 0.05 to 0.50% by mass,
M (M is Nb and/or Zr): 0 to 0.3% by mass,
balance T (T is a transition metal element and indispensably contains Fe), and inevitable impurities, the following inequality expressions (1), (2), and (3) being satisfied:

$$[T]-72.3([B]-0.45[Ti])>0 \quad (1)$$

$$([T]-72.3([B]-0.45[Ti]))/55.85<13[Ga]/69.72 \quad (2)$$

$$[Ga]\geq[Cu] \quad (3)$$

where [T] is the content of T expressed in terms of % by mass, [B] is the content of B expressed in terms of % by mass, [Ti] is the content of Ti expressed in terms of % by mass, [Ga] is the content of Ga expressed in terms of % by mass, and [Cu] is the content of Cu expressed in terms of % by mass.

2. The R-T-B based sintered magnet according to claim 1, further comprising:
Ti: 0.1% by mass or more and less than 0.15% by mass.

3. A method for producing the RTB based sintered magnet according to claim 1, the method comprising:
a step of preparing one or more kinds of main alloy powders and one or more kinds of additional alloy powders;
a step of mixing the one or more kinds of additional alloy powders with 0.5% by mass or more and 20% by mass or less among 100% by mass of a mixed alloy powder after mixing to obtain the mixed alloy powder of the one or more kinds of main alloy powders and the one or more kinds of additional alloy powders;
a molding step of molding the mixed alloy powder to obtain a molded body;
a sintering step of sintering the molded body to obtain a sintered body; and
a heat treatment step of subjecting the sintered body to a heat treatment;
wherein the one or more kinds of main alloy powders have the composition comprising:
R: 27.5 to 34.0% by mass,
RH: 2 to 10% by mass,
B: 0.89 to 0.97% by mass,
Ti: 0 to 0.2% by mass (excluding 0% by mass when Ti accounts for 0% by mass in the one or more kinds of additional alloy powders),
Ga: 0 to 0.4% by mass,
Cu: 0.07 to 0.50% by mass,
Al: 0.05 to 0.50% by mass,
balance T and inevitable impurities, and the one or more kinds of additional alloy powders have the composition comprising:
R1 (R1 is at least one of rare-earth elements other than a heavy rare-earth element RH, and indispensably contains Nd): 32 to 66% by mass,
B: 0.3 to 0.9% by mass,
Ti: 0 to 4% by mass (excluding 0% by mass when Ti accounts for 0% by mass in the one or more kinds of main alloy powders),
Ga: 0.7 to 12% by mass,
Cu: 0 to 4% by mass,
Al: 0 to 10% by mass,
balance T and inevitable impurities, the composition satisfying the following inequality expression (4):

$$[T] \leq 72.4[B] \tag{4}$$

4. The method for producing an R-T-B based sintered magnet according to claim 3, wherein the one or more kinds of main alloy powders are obtained by using a strip casting method.

5. A method for producing the R-T-B based sintered magnet according to claim 2, the method comprising:
a step of preparing one or more kinds of main alloy powders and one or more kinds of additional alloy powders;
a step of mixing the one or more kinds of additional alloy powders with 0.5% by mass or more and 20% by mass or less among 100% by mass of a mixed alloy powder after mixing to obtain the mixed alloy powder of the one or more kinds of main alloy powders and the one or more kinds of additional alloy powders;
a molding step of molding the mixed alloy powder to obtain a molded body;
a sintering step of sintering the molded body to obtain a sintered body; and
a heat treatment step of subjecting the sintered body to a heat treatment;
wherein the one or more kinds of main alloy powders have the composition comprising:
R: 27.5 to 34.0% by mass,
RH: 2 to 10% by mass,
B: 0.89 to 0.97% by mass,
Ti: 0 to 0.2% by mass (excluding 0% by mass when Ti accounts for 0% by mass in the one or more kinds of additional alloy powders),
Ga: 0 to 0.4% by mass,
Cu: 0.07 to 0.50% by mass,
Al: 0.05 to 0.50% by mass,
balance T and inevitable impurities, and
the one or more kinds of additional alloy powders have the composition comprising:
R1 (R1 is at least one of rare-earth elements other than a heavy rare-earth element RH, and indispensably contains Nd): 32 to 66% by mass,
B: 0.3 to 0.9% by mass,
Ti: 0 to 4% by mass (excluding 0% by mass when Ti accounts for 0% by mass in the one or more kinds of main alloy powders),
Ga: 0.7 to 12% by mass,
Cu: 0 to 4% by mass,
Al: 0 to 10% by mass,
balance T and inevitable impurities, the composition satisfying the following inequality expression (4):

$$[T] \leq 72.4[B] \tag{4}$$

6. The method for producing an R-T-B based sintered magnet according to claim 5, wherein the one or more kinds of main alloy powders are obtained by using a strip casting method.

7. The R-T-B based sintered magnet according to claim 1, wherein R is present in a content of 30.67 to 34.0% by mass.

* * * * *